June 18, 1968   F. C. GOOD   3,388,496
FISH LURE
Filed Jan. 14, 1966   3 Sheets-Sheet 1
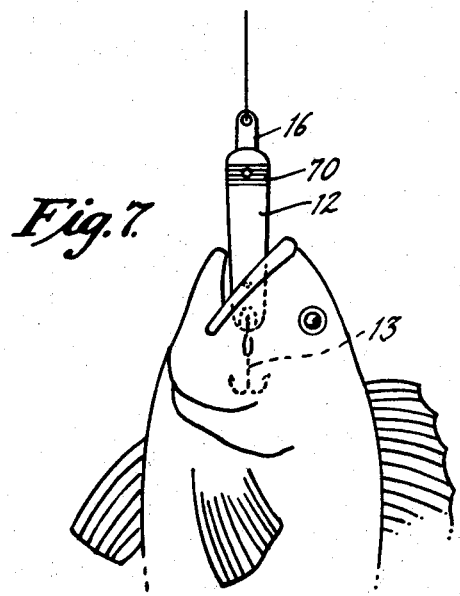
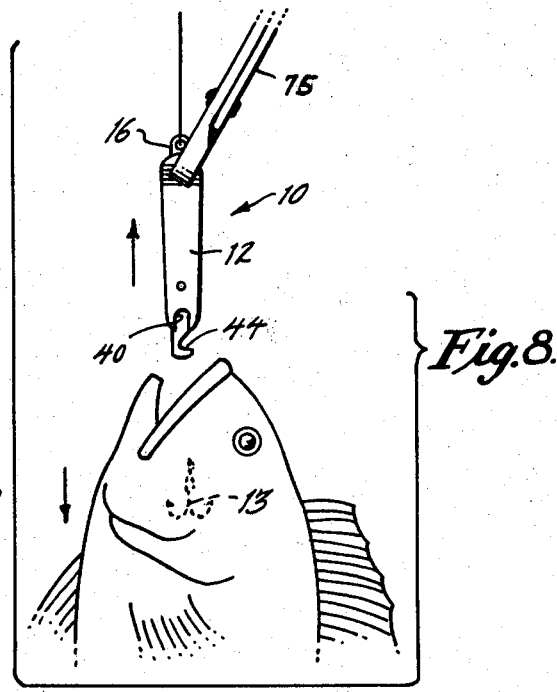
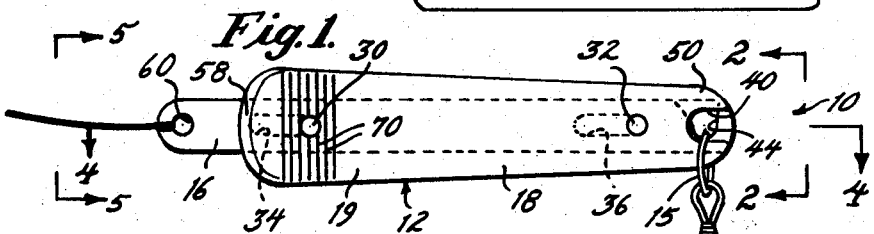
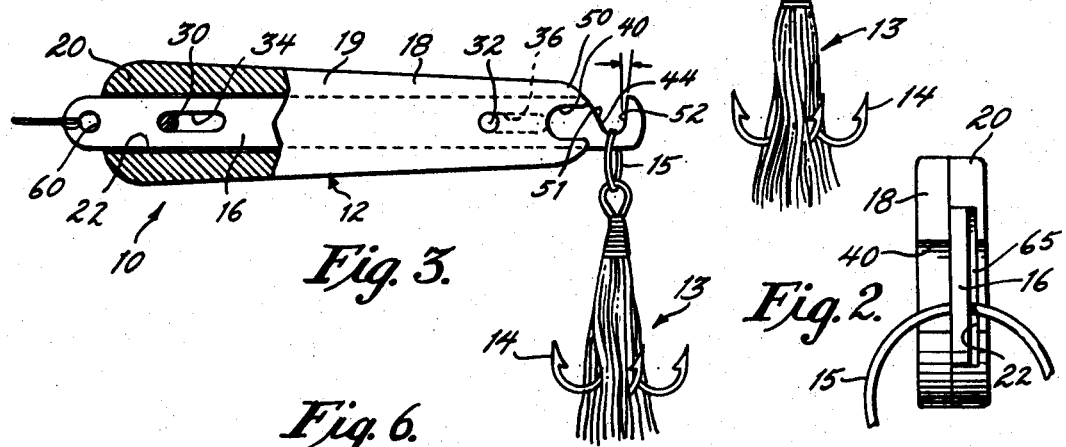
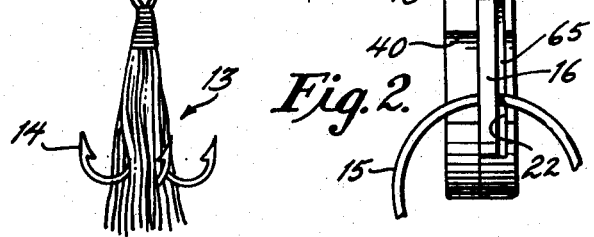
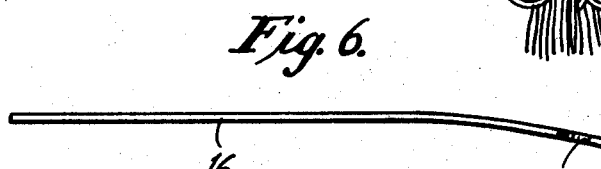
INVENTOR.
FRED C. GOOD
BY
*Peter J. Patane*
ATTORNEYS.

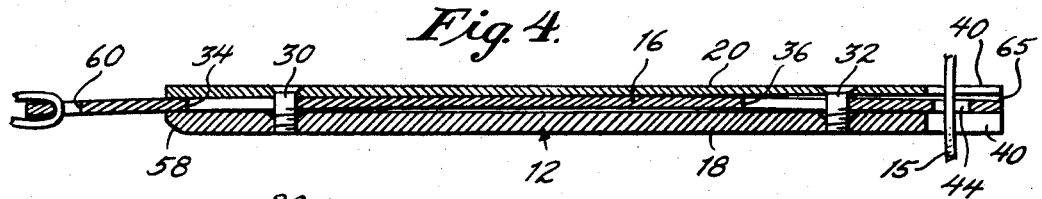
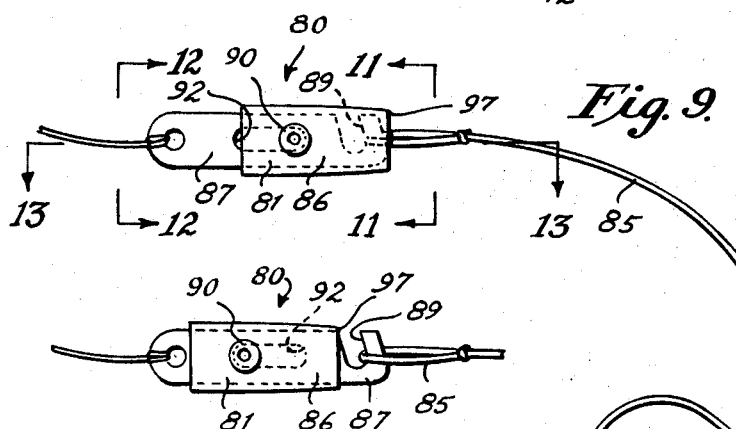
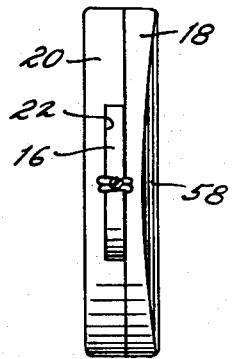
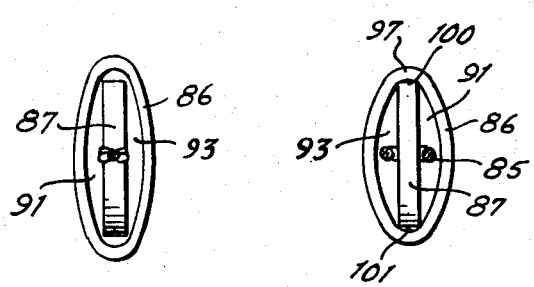
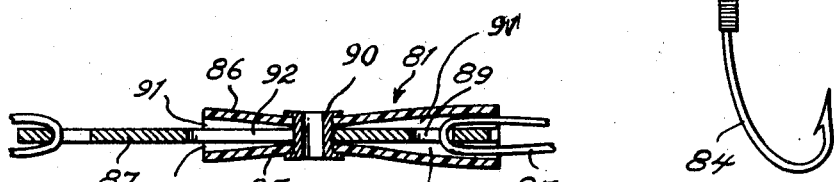
INVENTOR.
FRED C. GOOD

June 18, 1968 F. C. GOOD 3,388,496
FISH LURE

Filed Jan. 14, 1966 3 Sheets-Sheet 3

INVENTOR
FRED C. GOOD
BY Peter J Patane
HIS ATTORNEY

United States Patent Office 3,388,496
Patented June 18, 1968

3,388,496
FISH LURE
Fred C. Good, 809 Gilbert Road,
Cheltenham, Pa. 19012
Continuation-in-part of application Ser. No. 370,183,
May 26, 1964. This application Jan. 14, 1966, Ser.
No. 532,488
3 Claims. (Cl. 43—42.08)

ABSTRACT OF THE DISCLOSURE

A fish lure having an elongated body comprising two elongated sheaths. One of the sheaths has an open ended slot closed on one side by the other sheath and an elongated bar slidable in the slot. A fastening means for securing the sheaths together and retaining the bar in the slot. The bar having line attaching means at one end and a hook attaching means at the other end. The bar being of resilient material and initially bowed so as to be under tension when assembled between the sheaths.

---

This application is a continuation-in-part of my copending patent application Ser. No. 370,183, filed May 26, 1964, and now abandoned.

The primary object of my invention is to provide a lure from which the fishhook may be readily detached while still within the mouth or body of the fish.

Another object of my invention is to provide means for removing the hook from the fish without endangering the fingers of the fisherman and without ripping or tearing the mouth of the fish.

A still further object of my invention is to provide means for washing out sand and the like that may become lodged within the body of the lure.

A still further object of my invention is to permit relative movement between the sleeve of the lure body and its central bar, the fishing line being attached at one end of the latter and the fishhook at the other end.

Heretofore, various means have been provided for attaching and detaching a fishhook from the lure body. Such means generally required relatively large areas in which to work and a certain amount of dexterity. While some of these means have been proven reasonably satisfactory prior to the catching of a fish on the hook, they have had the disadvantage of not permitting the ready removal of the lure body from the fishhook or the ready separation of the lure body from the hook while the latter is within the mouth of the fish.

As a consequence, it has heretofore been common practice to either vigorously pull the hook from the fish, thereby ripping the mouth of the fish, or to cut the line holding the lure body when the structure of the fish resists easy dislodgment of the hook. In those cases where the hook is firmly held by the fish, it is obviously easier to wait until the fish is being cleaned, after the head has been removed from the body, so as to be able to slide the hook out backwards, rather than to attempt to open the jaw and slip it past the teeth and other obstructions.

My improved lure permits the ready detachment of the hook from the lure body while the hook is still within the mouth of the fish, thereby permitting the attachment of a new hook and the reintroduction of the lure into the fishing waters very quickly. The original hook is recovered when the fish is cleaned and the head detached from the body by merely continuing its passage and withdrawal from the rear of the head.

The foregoing and other objects of the invention, the principles of the invention, and the best modes in which I have contemplated applying such principles will more fully appear from the following description and accompanying drawings in illustration thereof.

FIG. 1 is a side elevational view of a lure comprising my improved lure body and a triple pronged fishhook assembly attached to one end thereof;

FIG. 2 is a partial, but enlarged, elevational view of the right-hand end of the lure body taken in the direction of the arrows 2—2 shown in FIG. 1;

FIG. 3 is a side elevational view, partly broken away and in section to show a part of the central bar in elevation, the central bar being moved to the right so that the loop of the fishhook assembly may be removed from the lure body;

FIG. 4 is a longitudinal sectional, enlarged view of the lure body shown in FIGS. 1 to 3;

FIG. 5 is an enlarged elevational view of the left-hand end of the lure body shown in FIG. 1;

FIG. 6 is a top plan view of the central bar of the lure body prior to assembly;

FIG. 7 is an illustration of a fish suspended from the hook assembly and the improved lure body;

FIG. 8 is a view similar to FIG. 7 with the lure body being detached from the hook assembly and the lure body being withdrawn from the fish's mouth, the hook assembly remaining in the fish's mouth;

FIG. 9 is a side elevational view of a modified lure body made in accordance with my invention showing the closed or retracted position of the central bar;

FIG. 10 is a side elevational enlarged view of the lure body illustrated in FIG. 9, but showing the extended or open position of the central bar;

FIGS. 11 and 12 are side elevational views of the right and left-hand sides, respectively, of the lure body illustrated in FIG. 9;

FIG. 13 is a longitudinal sectional view of the lure body illustrated in FIGS. 9 to 12;

Figure 14:
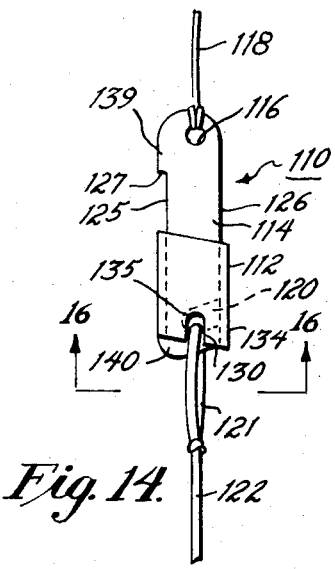
FIG. 14 is a side elevational view of a lure showing another embodiment of my invention, and showing the closed position of the central bar.

Referring to the drawings, my improved fish lure assembly 10 comprises an elongated lure body 12, the lower end of which, FIG. 7, is secured to a hook assembly 13 comprising a hook 14 and a loop or ring 15. The lure body 12 comprises a central flat bar 16 held in a sleeve 19 formed by sheaths 18 and 20, the sheath 20 having a long passage or slot 22 centrally formed therein, the bar 16 being longer, as illustrated, than the sheaths 18 and 20.

As viewed in FIG. 2, the right-hand side of the slot 22 is closed by the left-hand face of the sheath 18 and the slot 22 gives the sheath 20 a U-shape when viewed from either end. The bar 16 is guided for lengthwise reciprocal back and forth movement in the slot 22 by aligned, spaced screws 30 and 32 which extend through aligned, spaced elongated openings 34 and 36 in the center of the bar 16 and near the opposite ends thereof, the screws 30 and 32 extending through suitable axially aligned countersunk holes, as illustrated in FIG. 4.

The right-hand ends, FIGS. 1 and 3, of the sheaths 18 and 20 are formed with open-ended mouths 40 of U-shape opening horizontally to the right. The right-hand end of the bar 16 is formed with a similar U-shaped mouth 44, but the U-shape in the bar 16 is approximately at right angles to the U-shaped mouths 40. Also, when the bar 16 is retracted (to the left) its full amount, i.e., from the position of FIG. 3 to that of FIG. 1, i.e., until the screws 30 and 32 abut the right-hand ends of the walls defining the openings 34 and 36, the edge portions 50 of the sheaths 18 and 20 close the upper end, FIG. 1, of the U-shaped mouth 44 to prevent escape of the fishhook assembly 13. On the other hand, when the bar is moved to the right the full extent of its movement, i.e., to the position illustrated in FIG. 3, until the left-hand ends of the walls defining the openings 34 and 36 are engaged by the screws 30 and 32, the mouth 44 is moved completely out from registry with the end portion 50, so that the fishhook assembly 13 may be easily removed from the bar 16.

Preferably, the bar 16 is made of resilient, spring metal and initially bowed to the approximate shape illustrated in FIG. 6. Referring to FIG. 3, the left-hand side 51 of the mouth 44 slopes to the left to blend in smoothly with the rounded front edge of the portion 50 to facilitate entrance of the loop 15 and the right-hand side 52 of the mouth 44 preferably is perpendicular or tapers to the right to a maximum of about 5°. That is, it has been found in practice that when a fish is hooked, and the forward parts of the bar 16 and of the sheaths 18 and 20 have entered the fish's mouth, and are more or less confined in a small space, the lure body can be more easily separated from the hook assembly when the side 52 is perpendicular, i.e., at right angles to the axis of the bar 16 and the sheaths 18 and 20, or tapered to the right a maximum of about 5° as noted.

The slot 22 is made deeper at the right-hand end, FIG. 4, of the sheath 20, and tapered so that at its left-hand it is only slightly larger than the thickness of the bar 16 so as to permit the bar 16 to slide freely, back and forth, in the slot 22. Since the slot is so constructed as to taper to a depth greater than the thickness of the bar, a space 65 (FIG. 2) is provided for flushing out sand which may enter the slot 22 during use of the fish lure. It has been found that the sand which tends to enter does so mostly through the left-hand end or line end of the slot 22 and at the left-hand end therefore the slot should be preferably just large enough to permit the bar 16 to slide freely back and forth. However, the increasing depth of the slot 22 does tend to flush out whatever sand may nevertheless enter so that the bar 16 will not be jammed in its slot.

As one example, the bar 16 has been constructed of stainless steel metal of about .050 inch thickness and approximately 4$\frac{7}{16}$ inches long, the slot 22 being approximately 3$\frac{11}{16}$ inches long and having a depth of about .052 inch at its left end and about .062 inch at its right end, leaving a space of about .012 inch at the right end of the slot 22, as viewed in FIG. 4. Preferably, the sheaths 18 and 20, as well as the screws 30 and 32, are of stainless steel.

The screws 30 and 32, the elongated openings 34 and 36, the length of the bar 16, and the length of the sheaths 18 and 20 are all so related that when the bar 16 is fully retracted, i.e., moved to its leftwardmost position of FIG. 1, the top of the U-shaped mouth 44 registers with the end portions 50 and is closed thereby, and the bar 16 extends out beyond the left-hand end of the sheaths 18 and 20 its maximum amount, but when the bar 16 is fully extended, i.e., moved to its rightmost position of FIG. 3, the ring 15 may be easily removed from the U-shaped mouth, and the left-hand end of the bar extends out beyond the sheaths its minimum amount. Of course, to remove the hook assembly 13 from the bar 16 it is only necessary that the bar 16 move to the right a distance sufficient for the ring 15 to clear the end portion 50.

Since the bar 16 is of spring metal, the pull or weight on the bar required to move it may be varied by deforming the bar to a more or less bowed position. The use of the screws 30 and 32 permits the individual fisherman to easily adjust the lure body to his individual preference.

The left-hand end of the bar 16 which extends beyond the sheaths 18 and 20 in FIG. 3 may also be bent (toward and away from the plane of the paper in FIG. 3) to better balance the lure body 12, if desired.

Also, the resiliency of the bar 16 tends to tension the sheaths 18 and 20 on the screws 30 and 32 and provides a locking function, tending to resist any unthreading action of the screws as the fish lure moves about in the water when in use.

The upper or left-end of the bar 16 is provided with an opening 60 to which is attached the fisherman's line.

Also, the upper or left-hand ends of the sheaths have their outer surfaces provided with serrations 70 to better facilitate grasping of the sheaths between a pair of pliers 75.

Preferably, the sheaths 18 and 20 have the same contour and are symmetrical about their longitudinal axis, being, as shown in FIGS. 1 and 3, widest at the left and tapering to a more narrow width at the right. It has been found that if the sheaths 18 (the one which does not have the slot 22) is tapered or rounded, as indicated at 58, the resistance of the movement of the lure body 12 through the water is decreased.

Thus, when a fish is caught on the hook 14 and the line is taken in, the fish can be separated from the lure body 12 by grasping the upper serrated end of the lure body 12 and holding the lure body vertically, as shown in FIGS. 7 and 8. At such time the weight of the fish on the bar 16 will cause the bar to slide down whereupon a slight movement of the fish or lure body 12 transverse to each other will cause the bar 16 to separate from the ring 15.

It is seen that the hook assembly 13 remains in the fish and can easily be removed later by severing the head of the fish off just below the hook 14 and pulling the hook 14 out from, as it were, behind the fish's head.

The modified lure assembly 80 of my invention illustrated by FIGS. 9 to 13 is adapted for bottom fishing and comprises a lure body 81 and a hook assembly 82, wherein the hook 84 is suspended from a line 85 of suitable length. The lure body 81 comprises an elongated, tubular sleeve 86 within which is slidable an elongated bar 87, the line 85 being attached at a U-shaped mouth 89 formed on the right-hand end of the bar 87, FIGS. 9 and 10.

The bar 87 is secured to the sleeve 86 by a rivet or eyelet 90 which extends through an elongated, central slot 92 in the bar 87. The rivet 90 is secured near the left-hand end of the sleeve 86, the sleeve 86 being compressed a maximum amount adjacent the rivet 90, as indicated at 95 in FIG. 13.

The sleeve 86 takes an elliptical shape and defines elongated pockets 91 and 93 the length of the sleeve 86 and on either side of the bar 87, the pockets 91 and 93 being of varying cross sectional shape and size and being largest at the right-hand end of the sleeve 86, smallest adjacent the rivet 90, and at the left-hand end of the sleeve 86, FIG. 13, being almost as large as at the right-hand end.

Thus, the pockets 91 and 93, at the right-hand end, permit the part of the line carried by the bar 87 to enter the sleeve 86 and the top portion 97 of the sleeve to close the U-shaped mouth 89 when the bar 87 is retracted, FIG. 9. A comparison of FIGS. 11 and 12 shows that the left-hand ends of the pockets 91 and 93 are smaller than their right-hand ends. The smaller openings at the left-hand ends minimize the entry of foreign matter into the sleeve 86, but any foreign matter which does enter is flushed out through the larger right-hand ends of the pockets 91 and 93.

Also, as shown in FIG. 11, the edges 100 and 101 at the right-hand end of the bar 87 contact and slide along corresponding parts of the sleeve 86, but no such contact is made at the left-hand end of the bar 87, FIG. 12. That is, the diameter of the circular tube from which the sleeve 86 is made is initially slightly less than the width of the bar 87 and the tube is stiff enough to retain the shape illustrated in FIG. 12, the rivet 90 being sufficiently distant from the right-hand end of the sleeve 86 that the deformation at the right-hand end is insufficient to elongate the sleeve to the extent which it is elongated at the left-hand end. Also, the sleeve 86 is preferably of plastic material, such as nylon, and is, however, sufficiently soft to be deformed on assembly, by the rivet 90, to the shape shown.

The slot 92 is sufficiently long to permit the bar 87 to move to the right relative to the sleeve sufficiently for the U-shaped mouth 89 to move out from under the closing portion 97. Similarly, the slot 92 is sufficiently long to permit the bar 87 to move to the left, relative to the sleeve, sufficiently for the U-shaped mouth 89 to move under the closing portion 97 and to be closed thereby, trapping the part of the line looped about the bar at the U-shaped mouth 89.

Referring to FIGS. 9 and 10, the right-hand side of the U-shaped mouth 89 is inclined to the left, as illustrated, about 5° with a vertical line perpendicular to the axis of the lure body 81, to aid in retaining the line on the bar 87.

Figure 15:
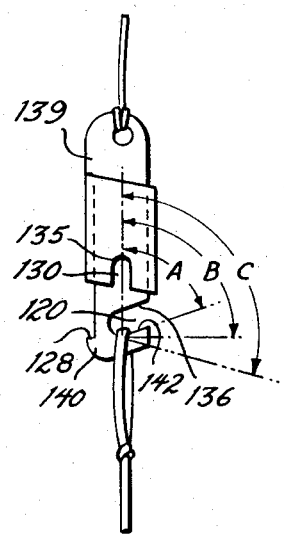
FIG. 15 is a side elevational view of the lure body illustrated in FIG. 14, but showing the open position of the central bar.
Figure 16:
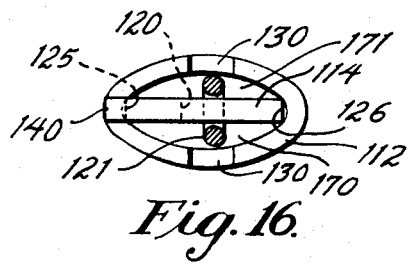
FIG. 16 is an end view taken generally along the line 16—16 in FIG. 14, but enlarged relative to FIG. 14.

Referring to FIGS. 14 to 16 another embodiment of my invention is illustrated. FIG. 14 illustrates a lure 110 comprising a tubular sleeve 112 of plastic material, preferably nylon, surrounding an elongated flat bar 114, preferably of stainless steel.

The bar 114 has a hole 116 at its upper end to which is attached the line 118 and a U-shaped mouth 120 at its lower end to which is attached the loop 121 of the hook line 122.

The sleeve 112 frictionally engages the opposed surface portions 125 and 126 of the bar 114 and the sleeve 112 may be moved back and forth between two limiting stops 127 and 128 formed on one side of the bar 114. The sleeve 112 has an elongated slot 130 overlying the U-shaped mouth 120, as shown in FIG. 14, when the sleeve 112 is in its lowest position, i.e., when the left-hand portion abuts the stop 128. The lower, right-hand or cover part 134 of the sleeve covers the mouth 120 and prevents the loop 121 of the hook line 122 from escaping when the sleeve 112 is in its lower position. The cover part 134 of the sleeve 112 is sufficiently long, and the slot 130 is also sufficiently long, so that if the hook line were to be twisted, as the fish tries to escape, until the loop 121 presses on the surface 135 (the bottom of the slot 130), tending to push the sleeve 112 in the direction to open the mouth 120, the loop 121 would bear against the surface 136 of the bar, before the mouth is uncovered, and further movement of the sleeve 112 due to the twisting of the fish line 122 could not take place.

The sleeve 112 is assembled to the bar 114 from one or the other end thereof by slipping it over the shoulder 139 or the shoulder 140 forming the stops 127 and 128. After the sleeve passes the stop 127 or 128 it springs against the edge surface 125. The width of the sleeve 112 is small enough to tightly engage the opposite surfaces 125 and 126 so that finger pressure is needed to slide the sleeve back and forth, i.e., the sleeve is not loose on the bar.

As illustrated in FIG. 15, it is preferred that the lower surface 142 (forming part of the mouth 120) be disposed at an angle with the longitudinal axis of the bar of not less than 85°, angle A, nor more than 105°, angle C, and 90°, angle B, is preferred. With the 90° angle, the loop 121 can be slipped off with little force. With an angle smaller than the angle A, i.e., smaller than 85°, the weight of the fish must be lifted up the inclined surface. With an angle larger than the angle C, i.e., larger than 105°, the weight of the fish would tend to cause the loop to slip down the inclined surface and this is not desired.

Note, in FIG. 16, that open ended pockets or passages 170 and 171 are formed on opposite sides of the bar through which foreign matter may be flushed out.

The surfaces 136 and 142 are spaced apart, as shown, a distance much greater than the thickness of the loop, to facilitate easy placement and removal of the loop within the mouth 120.

Figure 17:
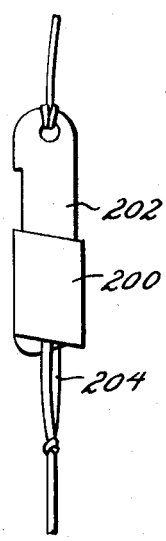
FIG. 17 is a side elevational view of still another embodiment of my invention.

The embodiment illustrated in FIG. 17 is similar to that illustrated in FIGS. 14 to 16, except that the sleeve 200 about the bar 202 has no transverse slot similar to slot 130 in FIGS. 14 to 16. In the embodiment of FIG. 17, a part of the loop 204 fits in the pockets between the sleeve 200 and the flat surfaces of the bar.

Of course, the slot 130 could be made longer, so that the base 135 would be above the surface 136 when in the position of FIG. 14.

As viewed in FIG. 16, the slot 130 is formed on both sides of the sleeve 112.

Having described my invention, what I claim is:

1. In a fish lure, an elongated body comprising two elongated sheaths, one of said sheaths having an open ended slot which is closed on one side by the other sheath, an elongated bar slidable back and forth between two limiting positions in said slot, fastening means for securing said sheaths together and retaining said bar in said slot, said bar having line attaching means at one end and a hook attaching means at the other end, said bar extending out beyond the ends of said sheaths, said hook attaching means being closed when said bar is in one of said positions and open when said bar is in the other of said positions, said slot, at one end, being deeper than the thickness of said bar and tapering so that at the other end its depth is about the thickness of said bar, and said bar being of resilient material and initially bowed so as to be under tension when assembled between said sheaths.

2. In a fish lure, an elongated body comprising two elongated sheaths, one of said sheaths having an open ended slot closed on one side by the other sheath, an elongated bar slidable in said slot, fastening means for securing said sheaths together and retaining said bar in said slot, said bar having line attaching means at one end and a hook attaching means at the other end, and said bar is of resilient material and initially bowed so as to be under tension when assembled between said sheaths.

3. In a fish lure, an elongated body comprising two elongated sheaths, one of said sheaths having an open ended slot closed on one side by the other sheath, an elongated bar slidable in said slot, fastening means for securing said sheaths together and retaining said bar in said slot, said bar having line attaching means at one end and a hook attaching means at the other end, said slot having a depth substantially equal to the thickness of said bar at the line attaching end and gradually increasing in depth to a depth greater than the thickness of said bar at the hook attaching end, and said bar is of resilient material and initially bowed so as to be under tension when assembled between said sheaths.

References Cited

UNITED STATES PATENTS

| | | | |
|---|---|---|---|
| 302,509 | 7/1884 | Mauthner | 24—239 |
| 652,556 | 6/1900 | Gavitt | 24—238 |
| 1,644,562 | 10/1927 | Browning | 24—239 |
| 1,713,041 | 5/1929 | Fey | 43—44.86 |
| 1,771,427 | 7/1930 | Waterhouse | 24—238 |
| 2,444,791 | 7/1948 | Stahnke et al. | 43—44.93 X |
| 3,023,535 | 3/1962 | Holka et al. | 43—44.86 X |
| 3,110,072 | 11/1963 | Carreberg | 24—239 |

FOREIGN PATENTS 461,046  11/1949  Canada.

WARNER H. CAMP, *Primary Examiner.*